United States Patent [19]

Geyer et al.

[11] Patent Number: 4,937,780
[45] Date of Patent: Jun. 26, 1990

[54] SINGLE INSTRUCTION UPDATING OF PROCESSING TIME FIELD USING SOFTWARE INVISIBLE WORKING REGISTERS

[75] Inventors: James B. Geyer, Natick; Victor M. Morganti, Lincoln; Patrick E. Prange, Brookline, all of Mass.

[73] Assignee: Bull NH Information Systems, Inc., Billerica, Mass.

[21] Appl. No.: 257,187

[22] Filed: Oct. 12, 1988

Related U.S. Application Data

[63] Continuation of Ser. No. 869,165, May 30, 1986, abandoned.

[51] Int. Cl.⁵ .................. G06F 3/14; G06F 15/16; G06F 9/21; G06F 15/36
[52] U.S. Cl. .................. 364/900; 364/937.1; 364/937.2; 364/933.7; 364/934; 364/934.4
[58] Field of Search ... 364/200 MS File, 900 MS File

[56] References Cited

U.S. PATENT DOCUMENTS

| | | | |
|---|---|---|---|
| 4,283,772 | 8/1981 | Johnston | 364/900 |
| 4,396,293 | 8/1983 | Mizoguchi | 364/569 |
| 4,497,022 | 1/1985 | Cormier et al. | 364/200 |
| 4,530,091 | 7/1985 | Crockett | 370/60 |
| 4,536,842 | 8/1985 | Yoneda et al. | 364/424 |
| 4,625,292 | 10/1986 | Philip | 364/569 |
| 4,659,231 | 4/1987 | Barouki | 368/15 |
| 4,685,073 | 8/1987 | Acker | 364/551 |
| 4,695,781 | 9/1987 | Ito | 318/603 |
| 4,746,920 | 5/1988 | Nellen et al. | 340/825.40 |
| 4,780,839 | 10/1988 | Hirayama | 364/710.01 |

Primary Examiner—Archie E. Williams, Jr.
Assistant Examiner—Ayni Mohamed
Attorney, Agent, or Firm—William W. Holloway; Faith F. Driscoll; John S. Solakian

[57] ABSTRACT

In a data processing system, a measurement of the cumulative time used in the performance of an intermittent activity can be required. To determine this cumulative time, a memory location is designated during initialization that is to contain the value of the system clock determined at each initiation of the intermittent activity. A second memory location is provided during initialization that is to contain the accumulated total of the measurements taken to perform the intermittent activity. At each termination of the intermittent activity, the contents of the first and second locations are retrieved from the main memory. The value stored in the first main memory location is then subtracted from the system clock value at the termination of the current intermittent activity and the resulting value is added to the contents of the second location. The resulting value of the addition operation is then stored in the second main memory location. This procedure is implemented with a single instruction and the instruction uses processor working registers for intermediate storage to expedite execution of the instruction.

6 Claims, 6 Drawing Sheets

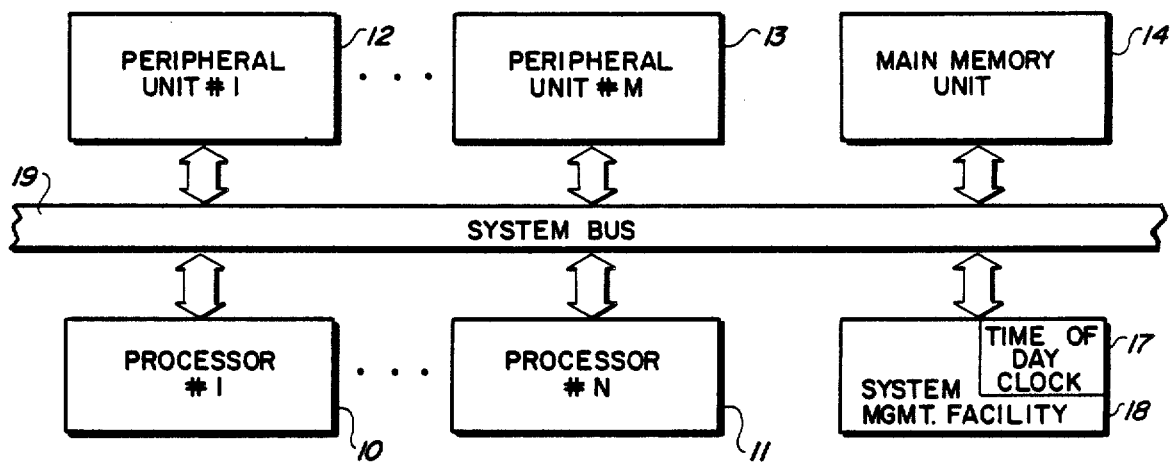
FIG. 1
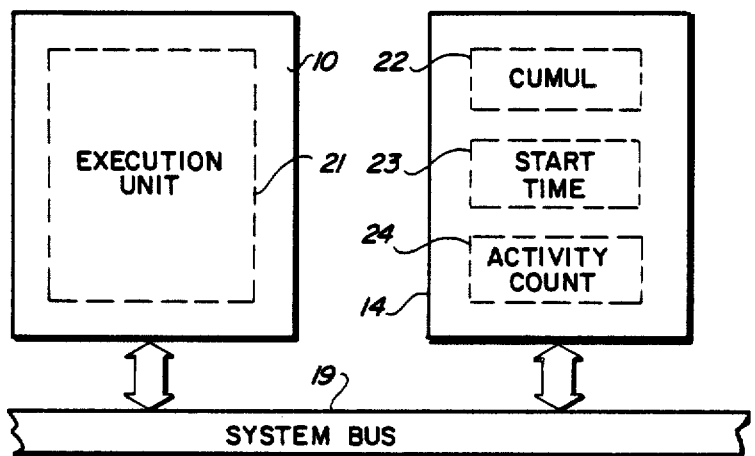
FIG. 2A
CUMUL = CUMUL FIELD + (TIME OF DAY FIELD - START TIME FIELD)
FIG. 2B
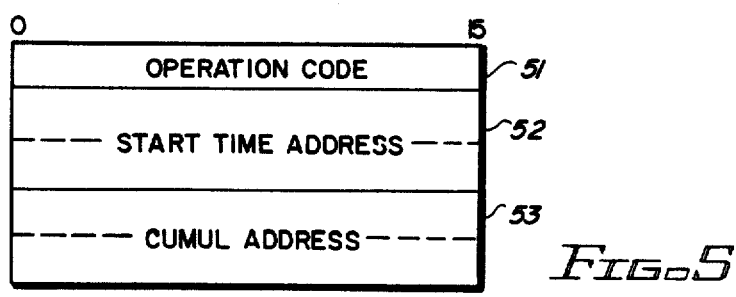
FIG. 5

SINGLE INSTRUCTION UPDATING OF PROCESSING TIME FIELD USING SOFTWARE INVISIBLE WORKING REGISTERS

This is a continuation of co-pending application Ser. No. 869,165 filed on May 30, 1986, now abandoned.

RELATED APPLICATION

The following U.S. Pat. Application is related to the instant Application:

System Management Apparatus for a Multiprocessor System, invented by George J. Barlow, Wallace A. Martland, Victor M. Morganti, et al., assigned to the same assignee named herein, having Ser. No. 06/869,164, and filed on May 30, 1986.

BACKGROUND OF THE INVENTION

1. Field of the Invention

This invention relates generally to data processing systems and, more particularly, to procedures within the data processing system for accumulating measurements of time for occurrences of a selected process.

2. Discussion of the Related Art

In a data processing system, it is frequently desirable to determine the length of time that the system is occupied in executing a selected process. It is known in the prior art to provide hardware apparatus coupled to the data processing system for the specific purpose of accomplishing such measurements. However, this apparatus is difficult to couple to the data processing system and can provide a potential source of damage to the data processing system. To avoid this problem, the measurements of the lengths of time that a processor spends implementing certain activities has been measured by internal software procedures in the data processing system. However, the software procedures have been unacceptably slow. Such a procedure loses much of its value when the measurement procedure requires an appreciable fraction of the activity time.

When internal data processing system processes are used to perform these measurements, a record is kept of the accumulated time for each occasion that the activity was present. This accumulated time is typically stored in a main memory location and is called the CUMUL field. The CUMUL field is the meter for the total time that the processor was involved in a selected activity. For each occasion that the activity is present in the processor, the CUMUL filed must be updated. The present invention relates to this updating procedure.

A need has therefore been felt for a cumulative measurement technique for an intermittent process that does not involve additional apparatus and which can be performed in a fraction of the time utilized by the activity being measured.

OBJECTS OF THE INVENTION

It is an object of the present invention to provide an improved data processing system.

It is a feature of the present invention to provide a procedure in a data processing system for accumulating time measurements for preselected activity.

It is yet another feature of the present invention to update the CUMUL field using a single instruction.

SUMMARY OF THE INVENTION

The aforementioned and other objects of the present invention are accomplished, according to the present invention, by providing an instruction that can update the CUMUL field with relatively few operations and without the use of the software visible registers. The instruction retrieves the start time of the process, stored when the activity was begun, and subtracts this quantity from the time at the end of the activity. This difference quantity is then added to the contents of the CUMUL field. When an average value is desired, a count field stored in main memory can be incremented by an additional instruction. Thus, the total time that the processor was involved in the activity can be determined along with the average time required each time the processor executed the measured activity.

These and other features of the present invention will be understood upon reading of the following specification in conjunction with the figures.

BRIEF DESCRIPTION OF THE DRAWINGS

FIG. 1 is a block diagram of the data processing system of the preferred embodiment utilizing the present invention.

FIG. 2A illustrates the location of fields required for the update CUMUL instruction, while FIG. 2B is an illustration of the algorithm implemented by the present invention.

FIG. 5 is a diagram of the instruction for updating the CUMUL meter according to the present invention.

Figure 3:
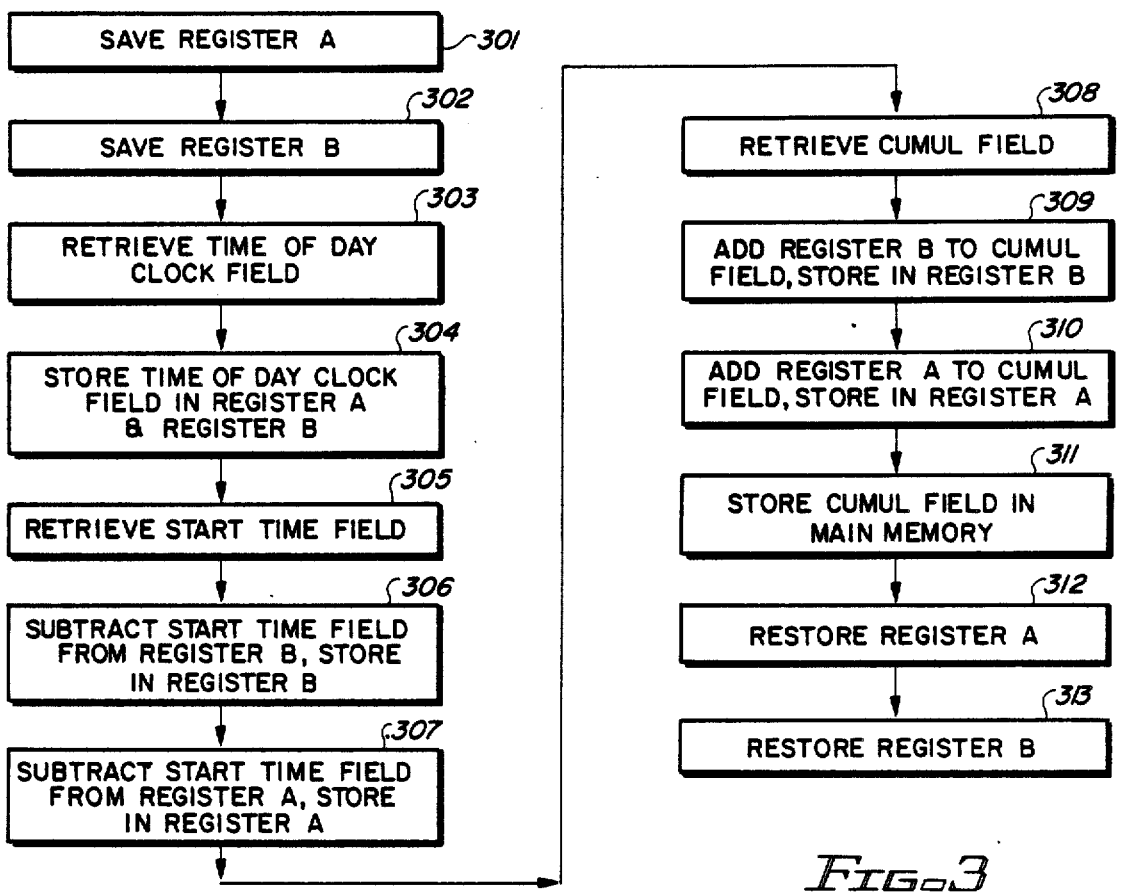
FIG. 3 is list of the operations used in the prior art to execute the algorithm for updating the CUMUL meter.

DESCRIPTION OF THE PREFERRED EMBODIMENT 1. Detailed Description of the Figures Referring now to FIG. 1, a data processing system capable of advantageously utilizing the present invention is shown. The data processing system includes at least one processor (illustrated by processor 10 and processor 11, a main memory unit 14, at least one peripheral interface unit (illustrated by peripheral interface unit 12 and peripheral interface unit 13) and a system bus 19. In addition, the system has a separate unit referred to as the system management facility 18. The system management facility provides numerous support functions needed for the data processing system including a time of day clock signal field. The processor(s) generally manipulate data according to prearranged sequences of instructions (or software programs). The peripheral unit(s) 12 (and 13) provide(s) an interface to the data processing system for users of the system and also provide(s) the mass storage of information required by the data processing system. The main memory unit 14 provides the facility for the storage of the data signal groups, the storage of programs, especially the operating system, and tables required for operation of the data processing system.

Referring next to FIG. 2A and 2B, the procedure for updating the CUMUL field is illustrated. The control of the procedure is derived from the execution unit (21) where, under control of instructions, the data signal groups are transferred between data processing system components via the system bus 19. At the time the update CUMUL instruction is initiated, the CUMUL field is stored in storage location 22 of the main memory unit 14, while the START TIME field is stored in storage location 23 in the main memory unit 14. The time of day clock 17 in the system management facility 18 is continuously providing a value related to the current time. In response to the update CUMUL instruction, the current TIME OF DAY field is transferred to the execution unit 21. The START TIME field is then retrieved from memory location 23 and transferred to the execution unit 21 via system bus 19. In the execution unit, the START TIME field is subtracted from the TIME OF DAY field to produce a difference field. The CUMUL field is then transferred to the execution unit 21 where the difference field is added thereto. The updated CUMUL field is then stored in memory location 22. An ACTIVITY COUNT field is also stored in a main memory location 24. This field records the number of times the activity requiring the update CUMUL command is invoked. In FIG. 2b, this procedure is described in terms of the arithmetic operations on the fields.

Referring next to FIG. 3, the flow diagram of the implementation of the update CUMUL process according to the prior art is show. Because the prior art uses software visible registers, the contents of these registers must be preserved during the execution of the current instruction. Therefore, prior to use of registers by the currently executing procedure, instructions must be executed to save the contents of register A (step 301) and register B (step 302). The requirement for two registers in the preferred embodiment results because the CUMUL, START TIME and the TIME OF DAY fields are 64 bits in length to prevent register overflow. The registers of the execution unit in the preferred embodiment are 32 bit positions in length. Therefore, two registers must be used to store these fields. The TIME OF DAY field is retrieved from the time of day clock 17 associated with the system management facility 18 in step 303. In step 304, the retrieved TIME OF DAY field is stored in register A and register B in the execution unit 21. In step 305, the START TIME field stored in memory location 23 (FIG. 2a) is transferred to the execution unit 21. In step 306, the highest order bits of the START TIME field are subtracted from the contents of register B, the highest order bits of the TIME OF DAY field, and the result is stored in register B. Similarly, the lowest order bits of the START TIME field are subtracted from the contents of register A and stored in register A in step 307. In step 308, the CUMUL field is retrieved from memory location 22 and entered in the execution unit. The highest order bits of the CUMUL field are added to the contents of register B and the resulting field is stored in register B in step 309, while the lowest order bits of the CUMUL field are added to the contents of register A and the resulting field is stored in register A in step 310. The contents of register A and register B, the new CUMUL field, are stored in main memory location 22 in step 311. In steps 312 and 313, the contents of register A and register B are respectively restored in register A and register B.

Figure 4:
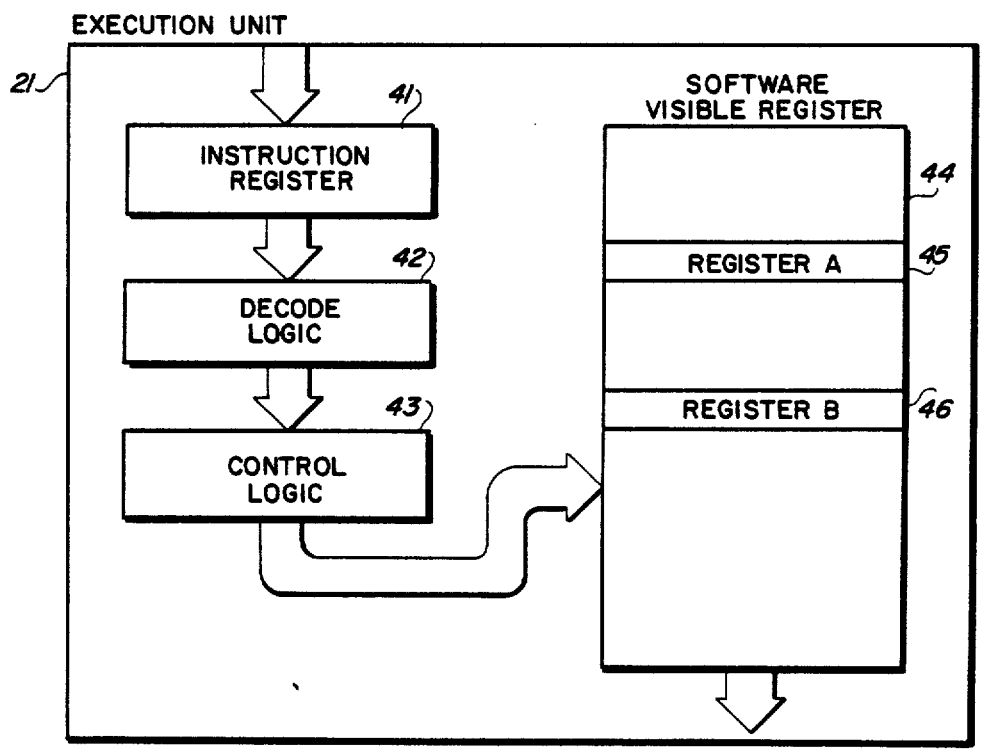
FIG. 4 is a block diagram of the apparatus of the prior art that is used to implement the procedure described in FIG. 3.

Referring next to FIG. 4, a portion apparatus for implementing the procedure shown in FIG. 3 is illustrated. The instruction register 41, in response to groups of signals stored therein, provides signals to the control logic of the execution unit that controls the movement of the data signal groups throughout the data processing system and controls the (logical) manipulation within the data processing system. The signals from the instruction register 41 are applied to decode logic apparatus 42 prior to application to the control store logic apparatus 43. The decode logic apparatus 42 can implement an instruction with a plurality of suboperations. One of the resources under the control of the instruction register 41 is the software visible register group 44. This group of registers, including register A 45 and register B 46, are controlled by the instructions entered in the instruction register 41. Thus any activity requiring these software visible registers 44 requires a new instruction. Furthermore, because the contents of these registers 44 can be needed on a continuing basis, for example in addressing procedures, the use of the registers 44 to execute an instruction set requires that, during the instruction set, the register contents must be saved and returned to the register at the end of the instruction set.

Referring next to FIG. 5, the format of the update CUMUL instruction, according to the present invention, is illustrated. The first 16 bits (double word) contain the operation code for the instruction The next double word(s) contains the information permitting the processor to address the main memory location storing the START TIME field. The remaining double word(s) of the instruction contains the information permitting the processor to address the location in main memory storing the CUMUL field.

Figure 6:
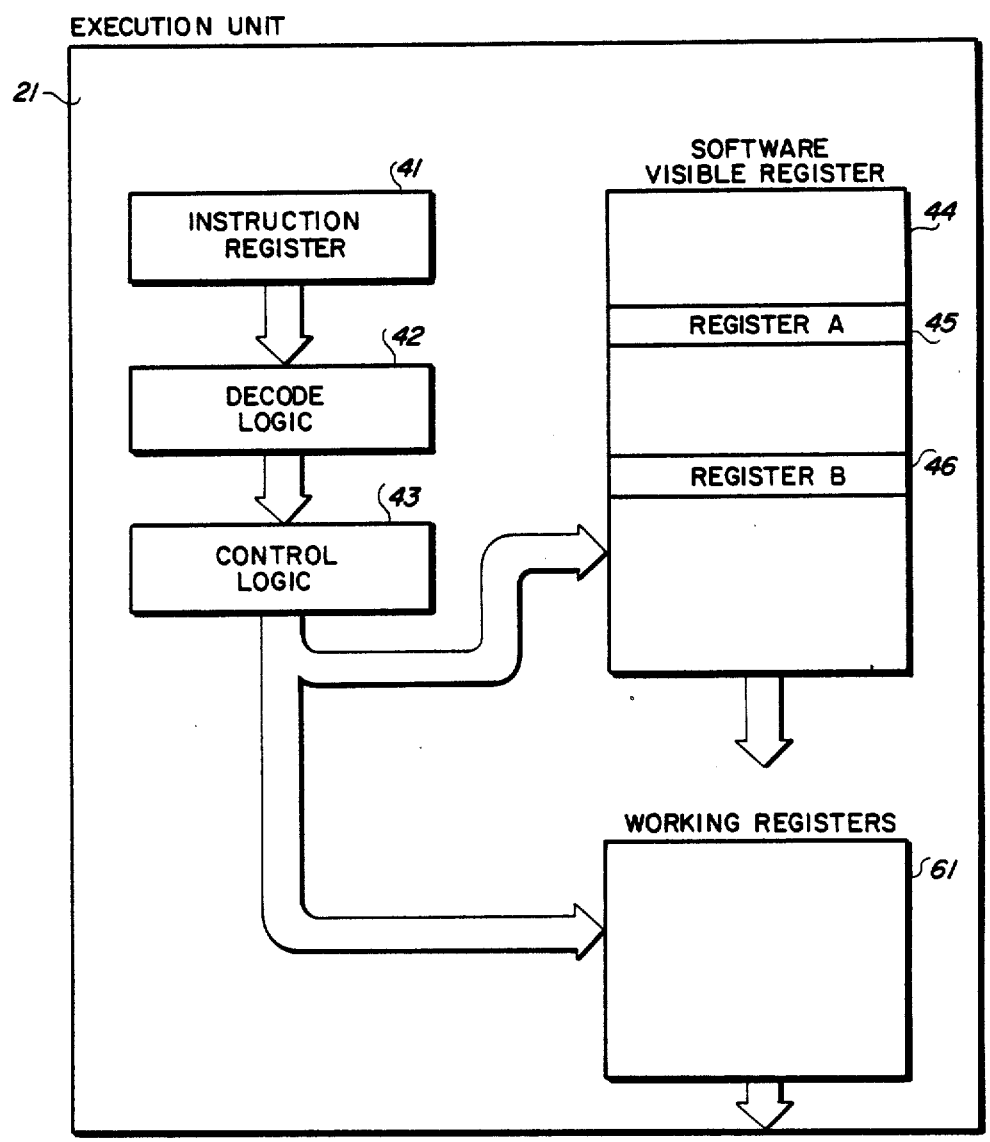
FIG. 6 is a block diagram of the apparatus for implementing the update CUMUL instruction according to the present invention.

Referring next to FIG. 6, the apparatus implementing the present invention is shown. The apparatus is similar to the apparatus of FIG. 4 with the exception that a group of registers 61, typically referred to as working registers or a scratch pad memory, has been added. Although these storage units are controlled by the control logic 43, the assignment of activity is performed in the decode logic 43 as part of a suboperation based on the instruction rather than explicitly designated in an instruction. The suboperation activity can be executed more rapidly than the similar operation performed using the software visible registers where the procedure must be implemented by individual instructions.

2. Operation of the Preferred Embodiment

In implementing the instruction to update the CUMUL field, the present invention relies on the use of working registers to increase the speed at which the instruction is implemented. The working registers (or scratch pad memory) can be used in a more informal manner than the software visible registers of the processor because, at the start of an instruction, all of the working registers are available for use by the instruction. The working registers are used only for temporary storage of signals during the execution of an instruction. In contradistinction thereto, the contents of the software visible registers must be clearly defined by each instruction as illustrated in the instruction sequence of FIG. 3. In addition, the contents of a software visible register must be the same after the execution of a procedure as before the procedure. Thus, the use of the working registers permits the execution of the update CUMUL instruction with less unproductive time and results in more efficient processor usage.

It will be clear that the full procedure to provide the updated CUMUL field includes other instructions that are not affected by the presence of working registers in the processors. For example, the instruction storing the TIME OF DAY field in the start time register in main memory, when initiation of the measured activity is begun, does not involve temporary storage in the software visible registers. Similarly, the instruction incrementing a count in a main memory register to determine the number of times the measured activity is identified does not involve temporary storage in the software visible registers.

The foregoing description is included to illustrate the operation of the preferred embodiment and is not meant to limit the scope of the invention. The scope of the claims is to be limited only by the following claims. From the foregoing discussion, many variations will be apparent to those skilled in the art that would yet be encompassed by the spirit and scope of the invention.

What is claimed is:

1. A method of measuring a time interval during which is predetermined activity is performed under control of a central processing unit of said data processing system, said method comprising the steps of:
    storing a clock value occurring at a beginning of each instance of said predetermined activity in a first main memory location;
    issuing a first instruction at an end of said each predetermined activity, said instruction including an operation code, said first main memory unit location, and a second main memory unit location;
    retrieving said first main memory unit location clock value and storing said first memory unit location clock value in at least one working store register of said central processing unit in response to control signals generated by said first instruction, wherein said working store registers are not available to direct control by instructions of a software program;
    retrieving a current clock value occurring at an end of said each instant of said predetermined activity in response to control signals generated by said first instructions;
    subtracting said first main memory unit location clock value stored in said working register from said current clock value occurring at an end of said each instance of said predetermined activity in response to control signals generated by said first instruction, said subtracting step resulting in a difference value, wherein said difference value is stored in a working store register in response to control signals generated by said first instruction;
    retrieving a cumulative clock value from said second main memory location in response to control signals generated by said first instruction;
    adding said difference value to said cumulative clock value to provide a new cumulative value in response to control signals generated by said first instruction; and
    storing said new cumulative value in said second main memory location in response to control signals generated by said first instruction.

2. A hardware/software systems for measuring a duration of a plurality of predetermined activities in a data processing unit, said system comprising:
    a system clock;
    a first location in a main memory unit storing a first system clock value, said first system clock value designating a beginning time for a one of said predetermined activities;
    a second location in said main memory for storing a cumulative value, said cumulative value providing a duration of all previous predetermined activities; and
    a preestablished instruction, said preestablished instruction including said first location and said second location and an operations code, said preestablished instruction being executed at an end of each predetermined activity;
    a central processing unit including at least one working store register, said working store registers being free to store data at a beginning of each instruction and being unavailable to software control said central processing unit including control means for providing control signals in response to said preestablished instruction, said central processing unit retrieving and storing said first location value in at least one working store register in response to control signals provided by said preestablished instruction, said central processing unit subtracting said first location value from a current clock value and storing a resulting value in a working store register in response to control signals provided by said preestablished instructions, said central processing unit retrieving said cumulative value and adding said resulting value to said cumulative value in response to said preestablished instruction control signals to provide a second resulting value, said second resulting value being stored in said second location in response to said preestablished instruction control signals.

3. The hardware/software system of claim 2 wherein said preestablished instruction is an update CUMUL field instruction.

4. A software/hardware combination in a data processing system for updating contents of a first location in a main memory unit, said combination comprising:
    a preestablished instruction having an operation code, a first main memory unit location, and a second main memory unit location;
    control logic responsive to said preestablished instruction for decoding said preestablished instruction and providing control signals for implementing said preestablished instruction;
    at least one working store register in a central processing unit for temporary storage of values retrieved from said main memory unit and for storing intermediate values determined by said central processing unit, said working store registers being available for storage at a beginning of each instruction and responsive to said control signals;
    a first main memory location for storing a cumulative value of the time during which a predetermined activity has been active;
    a second main memory unit location storing a clock value, said clock value identifying a time of initiation of a currently active predetermined activity;
    retrieval apparatus responsive to said control signals for retrieving said second main memory unit location clock value and storing said second main memory unit location clock value in a one working store register;
    arithmetic apparatus responsive to said control signals for subtracting said second main memory unit location clock value from a current clock value to obtain an intermediate value, said intermediate value being stored in a working store register, wherein said retrieval apparatus retrieves said first main memory unit location cumulative value, said arithmetic apparatus adding said intermediate value to said first main memory unit location cumulative value to provide a new cumulative value in response to said control signals; and storage means for storing said new cumulative value in said first main memory unit location in response to said control signals.

5. The combination of claim 4 further comprising a second instruction, said second instruction being executed when said predetermined activity is initiated, said instruction causing said control means to provide control signals storing a current clock value in said second main memory location.

6. The combination of claim 4 wherein said preestablished instruction is issued after completion of each predetermined activity.

* * * * *